(12) United States Patent
Shiota et al.

(10) Patent No.: US 8,154,649 B2
(45) Date of Patent: Apr. 10, 2012

(54) OPTICAL UNIT AND IMAGE PICKUP APPARATUS UTILIZING ELECTROSTRICTIVE DRIVE ELEMENTS

(75) Inventors: Natsuko Shiota, Ibaraki (JP); Yoshihiro Hara, Takatsuki (JP); Akira Kosaka, Yao (JP); Yasutaka Tanimura, Nara (JP)

(73) Assignee: Konica Minolta Opto, Inc., Tokyo (JP)

( * ) Notice: Subject to any disclaimer, the term of this patent is extended or adjusted under 35 U.S.C. 154(b) by 329 days.

(21) Appl. No.: 12/205,003

(22) Filed: Sep. 5, 2008

(65) Prior Publication Data
US 2009/0073302 A1 Mar. 19, 2009

(30) Foreign Application Priority Data
Sep. 14, 2007 (JP) .................................. 2007-239057

(51) Int. Cl.
*H04N 5/225* (2006.01)
(52) U.S. Cl. ....................................................... 348/340
(58) Field of Classification Search .................. 348/340, 348/335
See application file for complete search history.

(56) References Cited

U.S. PATENT DOCUMENTS

| | | | | |
|---|---|---|---|---|
| 5,298,933 | A * | 3/1994 | Chigira ............................ | 396/82 |
| 7,333,143 | B2 * | 2/2008 | Saito et al. ..................... | 348/335 |
| 7,528,880 | B2 * | 5/2009 | Yamaguchi et al. .......... | 348/335 |
| 7,626,621 | B2 * | 12/2009 | Ito et al. ......................... | 348/294 |
| 7,634,179 | B2 * | 12/2009 | Misawa ........................... | 396/55 |
| 2003/0184669 | A1 * | 10/2003 | Nishioka et al. ............... | 348/335 |
| 2004/0012683 | A1 * | 1/2004 | Yamasaki et al. .......... | 348/208.1 |
| 2005/0030408 | A1 * | 2/2005 | Ito et al. ......................... | 348/340 |
| 2007/0092235 | A1 * | 4/2007 | Misawa ........................... | 396/55 |
| 2007/0212046 | A1 * | 9/2007 | Sogoh et al. ..................... | 396/55 |
| 2007/0229702 | A1 * | 10/2007 | Shirono et al. ................. | 348/374 |
| 2009/0002825 | A1 * | 1/2009 | Morita et al. .................. | 359/554 |

FOREIGN PATENT DOCUMENTS

JP 2007-94237 A 4/2007
WO WO 2006/109433 A1 10/2006

OTHER PUBLICATIONS

Partial European Search Report dated May 26, 2009 for counterpart European Application No. EP 08 01 6023.

\* cited by examiner

*Primary Examiner* — Lin Ye
*Assistant Examiner* — Amy Hsu
(74) *Attorney, Agent, or Firm* — Cozen O'Connor (57) ABSTRACT

An optical unit is provided which is characterized by compact configuration, high performance and minimized noise, and which has a drive element to drive a lens cone holding an image pickup optical system, and has the same outside diameter as the lens cone, wherein the optical unit drives the image pickup optical system by expanding and contracting the drive element in a direction of an optical axis of the image pickup optical system. An image pickup apparatus is provided which is characterized by compact configuration, high performance and minimized noise, and which has an optical unit coupled to an image pickup unit through a drive element, and has the same outside diameter as the optical unit, wherein the apparatus drives the optical unit by expanding and contracting the drive unit in a direction of an optical axis of the optical unit.

11 Claims, 6 Drawing Sheets

OPTICAL UNIT AND IMAGE PICKUP APPARATUS UTILIZING ELECTROSTRICTIVE DRIVE ELEMENTS

This application is based on Japanese Patent Application No. 2007-239057 filed on Sep. 14, 2007, in Japanese Patent Office, the entire content of which is hereby incorporated by reference.

TECHNICAL FIELD

The present invention relates to an optical unit and image pickup apparatus, particularly to an optical unit provided with a drive element for driving a lens cone that holds an image pickup optical system, and an image pickup apparatus.

BACKGROUND

In a conventional image pickup apparatus such as a digital camera or video camera, all or some of the image pickup lenses are driven by a motor, whereby an auto-focusing function is performed. However, such a method has failed to provide desired focusing performance due to the backlash of the gear system for transmitting motor power. In particular, in the video camera, the motor noises as well as the sound have been recorded.

Thus, a technique has been proposed to minimize the chance of the motor noise being recorded and to improve focusing performance. According to this proposal, a focusing motor is used for rough focusing and a polymer actuator is employed for accurate focusing. An image pickup lens is wobbled by the polymer actuator to detect the focused state and lens traveling direction (Patent Japanese Unexamined Patent Application Publication No. 2007-94237)

In the method disclosed in Japanese Unexamined Patent Application Publication No. 2007-94237, however, the drive shaft of the focusing motor and guide shaft are mounted outside the lens holding frame. This structure increases the outside dimension of the lens drive apparatus and cannot be applied to a microminiaturized image pickup apparatus such as a mobile phone with a built-in camera having appeared in recent years. Although the probability of using the focusing motor is small, the motor noise can be recorded when the focusing motor is used. This does not solve the problem.

An object of the present invention is to solve the aforementioned problem and to provide an optical unit and image pickup apparatus which are characterized by compact configuration, high performance, and minimized noise and which are preferably used in a mobile phone with a built-in camera.

SUMMARY

In view of forgoing, one embodiment according to one aspect of the present invention is an optical unit, comprising:
an image pickup optical system;
a lens barrel which holds the image pickup optical system; and
a drive element which is provided on an end face of the lens barrel, and is adapted to expand and contract in a direction parallel to an optical axis of the image pickup optical system.

According to another aspect of the present invention, another embodiment is an optical unit, comprising:
an image pickup optical system;
a lens barrel which is constituted of a first partial lens barrel and a second partial lens barrel, one of the first partial lens barrel and the second partial lens barrel holding the image pickup optical system; and
a drive element which is provided between the first partial lens barrel and the second partial lens barrel, and is configured to expand and contract in a direction parallel to an optical axis of the image pickup optical system.

According to another aspect of the present invention, another embodiment is an image pickup apparatus, comprising:
an image pickup optical system;
a lens barrel which holds the image pickup optical system;
an image pickup unit having an image pickup device; and
a drive element which is provided between the lens barrel and the image pickup unit, and is configured to expand and contract in a direction parallel to an optical axis of the image pickup optical system so as to vary a distance between the lens barrel and the image pickup unit.

According to another aspect of the present invention, another embodiment is an image pickup apparatus, comprising:
an image pickup optical system;
a lens barrel which holds the image pickup optical system;
an image pickup unit having an image pickup device; and
a plurality of drive elements, each of which is provided, between the lens barrel and the image pickup unit, at a different position in a rotational direction about an optical axis of the image pickup optical system, and is configured to expand and contract in a direction parallel to the optical axis of the image pickup optical system so as to tilt the optical axis of the image pickup optical system.

DETAILED DESCRIPTION OF THE PREFERRED EMBODIMENT

The following describes the present invention with reference to the illustrated embodiments, without the present invention being restricted thereto. The same portions in the drawings will be assigned with the same reference numerals and will not be described to avoid duplication.

Figure 1A:
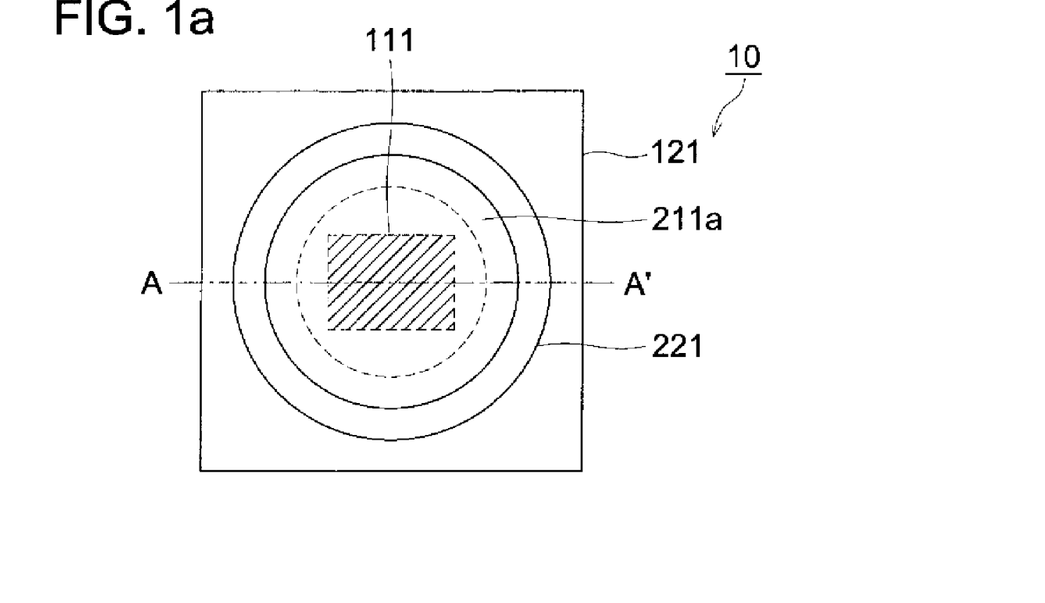
FIGS. 1a and 1b are the schematic diagrams representing the structure of an optical unit and image pickup apparatus of a first embodiment of the present invention.
Figure 1B:
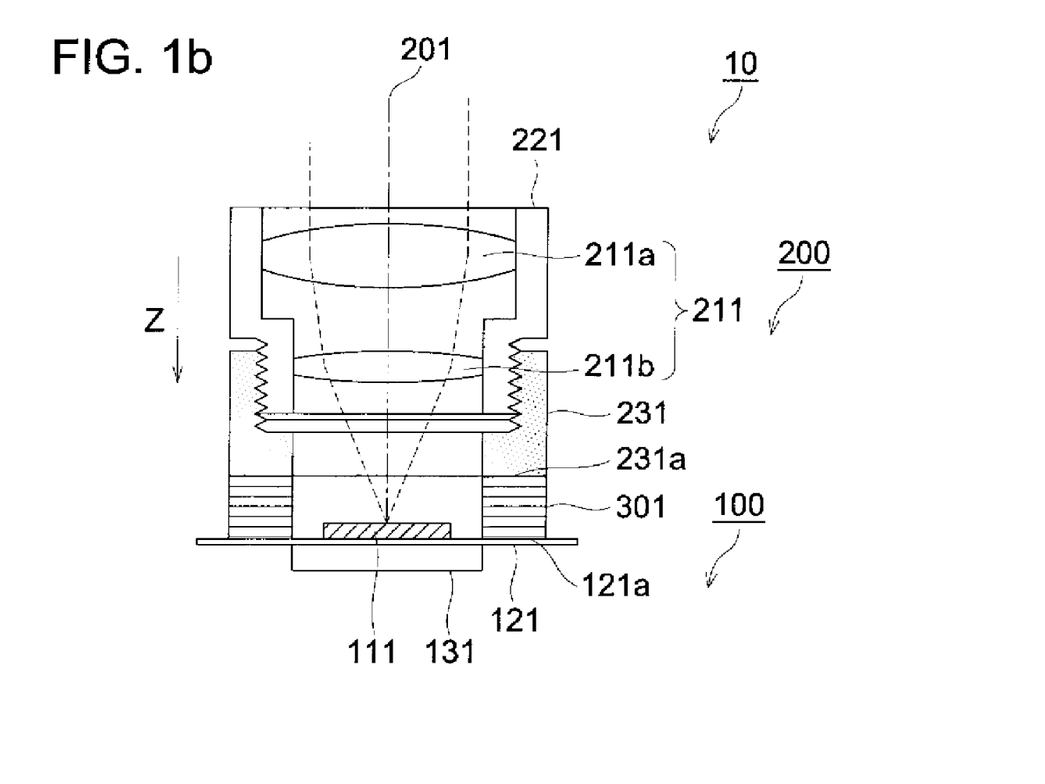

In the first place, the following describes a first embodiment of an optical unit and image pickup apparatus of the present invention with reference to FIGS. 1a and 1b. FIGS. 1a and 1b are the schematic diagrams representing the structure of an optical unit 200 and image pickup apparatus 10 of the first embodiment of the present invention of. FIG. 1a is a diagram showing the optical unit 200 and image pickup apparatus 10 as viewed from the image pickup optical system side. FIG. 1b is a cross sectional view taken along arrow line A-A' in FIG. 1a.

In FIGS. 1a and 1b, the image pickup apparatus 10 includes an image pickup unit 100, optical unit 200, and drive element 301. The image pickup unit 100 includes an image pickup device 111, image pickup board 121, and image pickup circuit 131. The optical unit 200 includes an image pickup optical system 211, a holding frame 221 of the image pickup optical system 211, and optical system support 231. The holding frame 221 and optical system support 231 serve as a lens cone of the present invention.

The image pickup device 111 is mounted on one surface of the image pickup board 121, and the CPU and circuit components, which constitute the image pickup circuit 131, are mounted on the other surface.

The image pickup optical system 211 is made up of two lenses 211a and 211b. The lenses 211a and 211b are fixed inside the holding frame 221 at predetermined intervals. The outer periphery of the holding frame 221 and the inner periphery of the optical system support 231 are threaded. When the image pickup apparatus 10 is assembled, the holding frame 221 is screwed into the optical system support 231 so that the focus of the image pickup optical system 211 is adjusted. After the focus has been adjusted, the holding frame 221 and optical system support 231 are fixed in position by adhesion or similar means.

The drive element 301 is arranged between the end face, on the side of the image pickup surface imaging-side end face 231a of the optical system support 231 and the surface 121a of the image pickup board 121 on which the image pickup device 111 is mounted. The drive element 301 and optical system support 231 are connected with each other by bonding or similar means, and so are the drive element 301 and image pickup board 121.

As will be described later with reference to FIGS. 2a, 2b, 2c, and 2d, when a drive voltage is applied to the drive element 301, the drive element 301 contracts in the direction of the optical axis 201 (Z-axis direction in the drawing), and the image pickup optical system 211 is pulled down in the direction of the optical axis 201 (Z-axis direction in the drawing) through the optical system support 231 and holding frame 221, whereby auto-focusing operation is performed.

As described above, according to the first embodiment of the optical unit 200 and image pickup apparatus 10, the optical unit 200 and image pickup unit 100 are directly coupled by the drive element 301, and the drive element 301 is expanded and contracted in the direction of the optical axis of the optical unit 200. Thus, the image pickup optical system 211 can be configured to have about the same outside shape and to drive the image pickup optical system 211. This arrangement provides an optical unit 200 and image pickup apparatus 10 which are characterized by compact configuration and high performance, and which are preferably used in a mobile phone with a built-in camera.

Figure 2A:
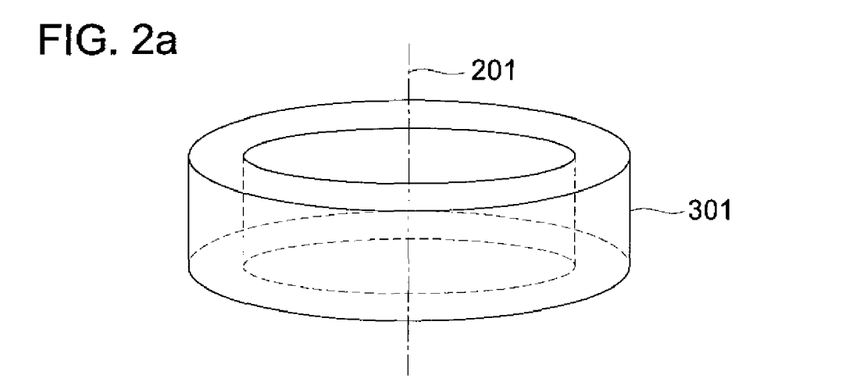
FIGS. 2a, 2b, 2c, and 2d are the schematic diagrams representing the structure of a first example of a drive element.
Figure 2B:
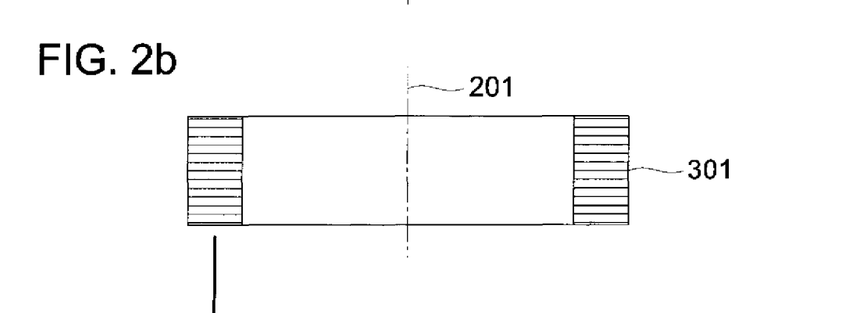
Figure 2C:
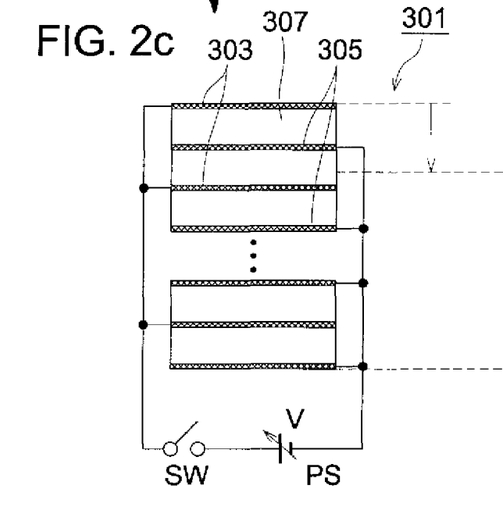
Figure 2D:
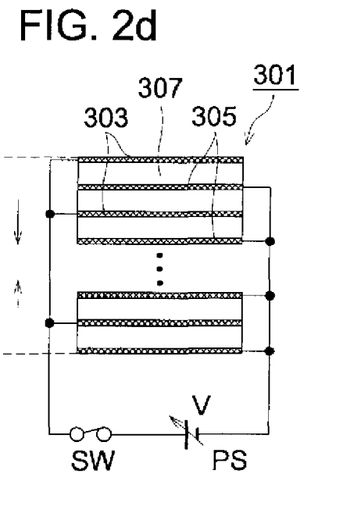

The following describes the first example of the aforementioned drive element 301 with reference to FIGS. 2a, 2b, 2c, and 2d. FIGS. 2a, 2b, 2c, and 2d are the schematic diagrams representing the structure of the first example of the drive element 301. FIG. 2a is a perspective view showing the shape of the drive element 301, and FIG. 2b is a cross sectional view taken along a plane including the optical axis 201, and FIGS. 2c and 2d show the drive method.

In FIG. 2a, in the first example, the drive element 301 is cylindrical and axially symmetric with respect to the optical axis 201 of the image pickup optical system 211. Its end faces are designed in the same shape as the imaging-side end face 231a of the optical system support 231 of FIG. 1b. As described with reference to FIGS. 1a and 1b, the imaging-side end face 231a of the optical system support 231, and the end face of the drive element 301 are connected by adhesion or similar means.

In FIGS. 2b and 2c, the drive element 301 is a stacked-type actuator which is formed by laminating cylindrical thin plates in the direction of the optical axis 201. The first electrode 303, variable portion 307, second electrode 305, variable portion 307 and first electrode 303 are stacked in this order. Examples of the stacked-type actuator include an electrostrictive polymer actuator and liquid crystal elastomer, without being restricted thereto. These actuators have holding functions as structures, and are capable of supporting the optical unit 200.

In FIG. 2c, a drive power source PS (drive voltage V) is connected through a switch SW between the first electrode 303 and the second electrode 305.

In FIG. 2d, when the switch SW is closed, a drive voltage V is applied between the first electrode 303 and the second electrode 305 from the power source PS so that the variable portions 307 contract. This causes the drive element 301 to contract in the direction of the optical axis 201. The contracted amount of the variable portions 307 is proportional to the magnitude of the drive voltage V of the power source PS. In the case of other type of the drive element 301 is used, by reversing the direction of the drive voltage V, the variable portion 307 can expand and the drive element 301 thereby expands in the direction of the optical axis 201. Unlike the motor, the stacked-type actuator produces almost no noise during the drive. Thus, the actuator noise is not recorded even when it is used in the video camera.

The following describes an example of the aforementioned stacked-type actuator.

An example of the stacked-type actuator is one called an electrostrictive polymer actuator or dielectric elastomer. It has a configuration in which a polymeric elastomer is sandwiched by flexible electrodes. When an electric field is applied between the electrodes, the polymeric elastomer is crushed by the attraction force between the electrodes, whereby the actuator contracts in the direction of the electrodes and expands in the direction parallel to the electrodes. Examples are given in "Nagata et. al. "Forefront of development of the soft actuator—Toward the implementation of the artificial muscle"; p. 207, FIG. 12 (N.T.E. Inc.)".

Another example is one called a liquid crystal elastomer or liquid crystal gel actuator. An electric field or heat is applied to the liquid crystal gel formed by the three-dimensional connection of liquid crystal molecules, whereby the liquid crystal phase having a regular arrangement is changed into the isotropic phase having an irregular orientation. This causes deformation. Depending on the type of the liquid crystal, some contract and others expand in the direction wherein the electric field is applied. Examples are given in "Nagata et. al. "Forefront of development of the soft actuator—Toward the implementation of the artificial muscle"; p. 217, FIG. 1 (N.T.E. Inc.)", and "Kyushu Institute of Technology "Artificial muscle actuated by liquid crystal elastomer", http://www.phys.mse,kyutech.ac.jp/elastomer.htm (searched on Sep. 12, 2007)".

Referring to specific examples, the following describes constituent materials of the actuator and production methods using such materials:

(Constituent Materials of Actuator)

The materials constituting actuators such as one shown in FIGS. 2a, 2b, and 2c will be explained. The following describes typical materials for the variable portion and electrode constituting the drive element 301.

Various organic materials are known as materials for the deformable variable portion 307. They are known under the name of polymer actuator materials. They are subjected to deformation such as expansion, contraction, and bending by an electric field or other non-mechanical stimulus. Using a low energy, these materials achieve a biologically soft movement that has not been realized so far, and are capturing the spotlight in a great variety of fields.

The aforementioned actuator utilizes the expansion and contraction by an electric field. Various kinds of conventionally known polymer actuators can be used. In particular, the preferred materials include polyaniline, polypyrrole, polythiophene, polyvinylidene fluoride, and silicone rubber.

Various forms of conductive materials have been known as materials for the first electrode 303 and second electrode 305. There is no restriction to these materials as long as they are conductive on a practical level. Examples include platinum, gold, silver including paste-like silver, nickel, chromium, copper, iron, tin, antimony lead, tantalum, indium, palladium, tellurium, rhenium, iridium, aluminum, ruthenium, germanium, molybdenum, tungsten, tin oxide, antimony, indium/tin oxide (ITO), fluorine-doped zinc oxide, zinc, graphite, carbon including glassy carbon and carbon paste, lithium, beryllium, sodium, magnesium, potassium, scandium, titanium, manganese, zirconium, gallium, niobium, sodium-potassium alloy, magnesium/copper mixture, magnesium/silver mixture, magnesium/aluminum mixture, magnesium/indium mixture, and lithium/aluminum mixture.

A conductive polymer can also be used preferably as the conductive materials. The conductive polymer can be exemplified by polyacetylene, polyaniline, polypyrrole, polythiophene, polyphenylene, polyethylenedioxythiophene (PEDOT), derivatives thereof, analogs thereof, polymer containing as components the monomer or oligomer constituting the same, to which adequate additives are added, as required. These can be used without any problem if they are conductive on a practical level. To put it more specifically, a complex of polyaniline, polystyrene sulfonic acid and carboxylic acid, or a complex of polyethylenedioxythiophene, polystyrene sulfonic acid and carboxylic acid are preferably used.

Dispersion containing metallic particles can be used as the conductive material. A conventionally known conductive paste can be used as the dispersion containing metallic particles. It is preferred to use the dispersion containing metallic particles having a particle size of 1 through 50 nm, preferably 1 through 10 nm. The metal contained as particles is exemplified by platinum, gold, silver, nickel, chromium, copper, iron, tin, antimony lead, tantalum, indium, palladium, tellurium, rhenium, iridium, aluminum, ruthenium, germanium, molybdenum, tungsten, and zinc. An electrode is preferably formed by using the dispersion which is prepared by dispersing these metallic particles in water or a desired disperse medium as an organic solvent, using a dispersion stabilizer mainly composed of an organic material. Such a metallic particle dispersion can be prepared by a physical generation method such as an in-gas evaporation method, sputtering method, and metallic vapor composition method, or by a chemical generation method such as a colloid method and co-sedimentation method wherein metallic ions are reduced in the liquid phase to generate metallic particles.

(Production Method of Actuator Device)

The actuator device can be produced by the process wherein the aforementioned electrode material and organic displacement material as a polymer actuator are stacked one after another, each in an adequate pattern.

There is no particular restriction to the method of patterning. However, it is preferred not to use a method that may degenerate the material constituting the actuator device, or not to use a component that may raise problems when the actuator device performs its function. For example, it is possible to use the mask deposition method, spray coating method, spin coating method, blade coating method, dip coating method, casting method, roll coating method, bar coating method, dye coating method, gravure printing method, screen printing method, inkjet printing method, micro-contact printing method, and LB method. Any of these methods can be used in conformity to the material.

Of these methods, the micro-contact printing method and inkjet printing method are particularly preferably used. In the case of the inkjet printing method, although the conventionally known inkjet printing method such as the piezoelectric method can be used, the electrostatic suction method is preferably used because it is capable of forming fine patterns. In the case of the micro-contact printing method, the method disclosed in the Japanese Translation of PCT International Application Publication No. 2005-509229 and Japanese Translation of PCT International Application Publication No. 2005-521238 can be modified, to conform to the materials to be used, and be used.

The entire production process of the drive element 301 of the present embodiment is carried out preferably at a temperature below about 200° C., more preferably below 150° C. Selection of the temperature generally depends on the processing parameters. The production method of actuator devices wherein patterned layers of the aforementioned organic materials are stacked allows the use of the aforementioned processing temperature which is much lower than that for processing the conventional inorganic actuator. It also permits the use of a less costly substrate such as a flexible polymer substrate.

As described above, the aforementioned drive element 301 of the present embodiment can be manufactured by a simple production method at a reduced cost.

As described above, the first example of the drive element 301 provides an advantage of minimized noise in the image pickup apparatus 10 in addition to the advantages described above.

Figure 3:
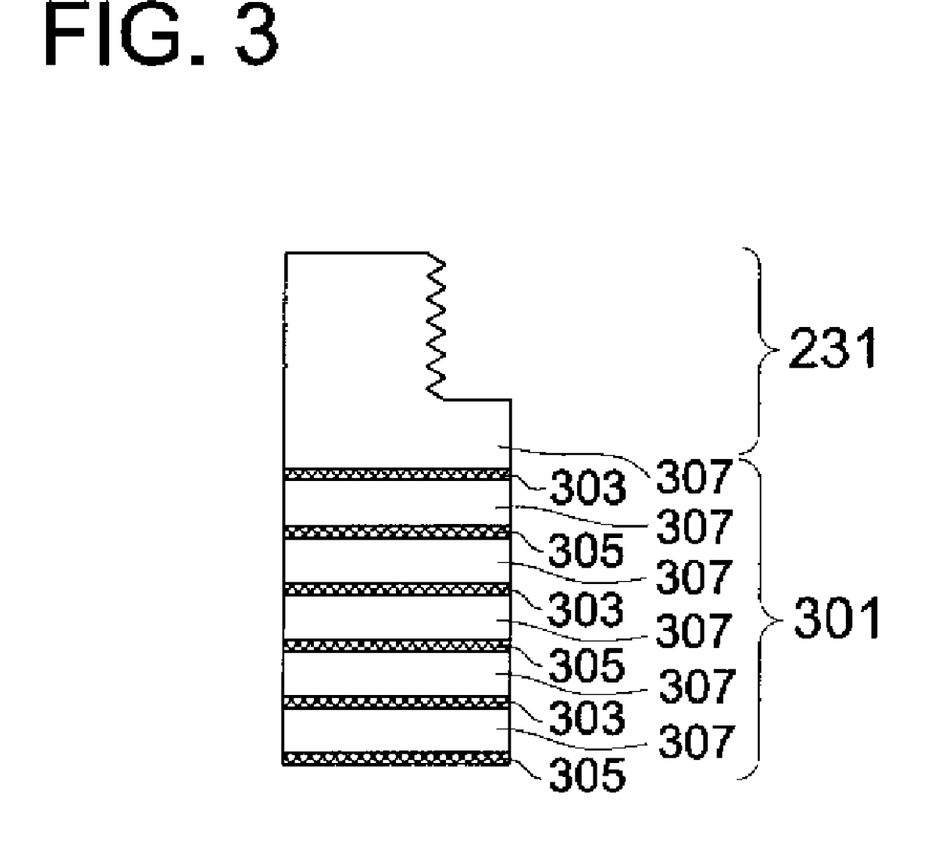
FIG. 3 is a schematic diagram representing the structure of a second example of the drive element.

Referring to FIG. 3, the following describes a second example of the drive element 301. FIG. 3 is a schematic diagram representing the structure of the second example of the drive element 301.

In FIG. 3, the drive element 301 and the optical system support 231 are integrally formed. In the portion functioning as the drive element 301, the first electrode 303, variable portion 307, and the second electrode 305 are sequentially stacked as shown in FIG. 2c. In the meantime, the first electrode 303 and the second electrode 305 are not formed on the portion functioning as the optical system support 231. Only the same material as that of the variable portion 307 is stacked thereon.

This structure ensures that, when a drive voltage V is applied between the first electrode 303 and the second electrode 305, the portion functioning as the drive element 301 functions as an actuator, as shown in FIG. 2d. The portion functioning as the optical system support 231 without an electrode formed thereon is not subjected to any change in shape. Despite the integral structure, it serves two functions—that of the drive element 301 and that of the optical system support 231.

The actuator that permits an integral structure to be designed is exemplified by the electrostrictive polymer actuator and liquid crystal elastomer that have been described with reference to FIGS. 2a, 2b, 2c, and 2d. Each of these actuators has a holding function as a structure and is capable of holding an optical system.

As described above, according to the second example of the drive element 301, in addition to the advantages provided by the first embodiment of the optical unit 200 and image pickup apparatus 10, and the first example of the drive element 301, an image pickup apparatus 10 having advantages in cost can be provided because integration of the drive element 301 and the optical system support 231 makes it possible to reduce the number of parts and production steps such as adhesion step.

Figure 4A:
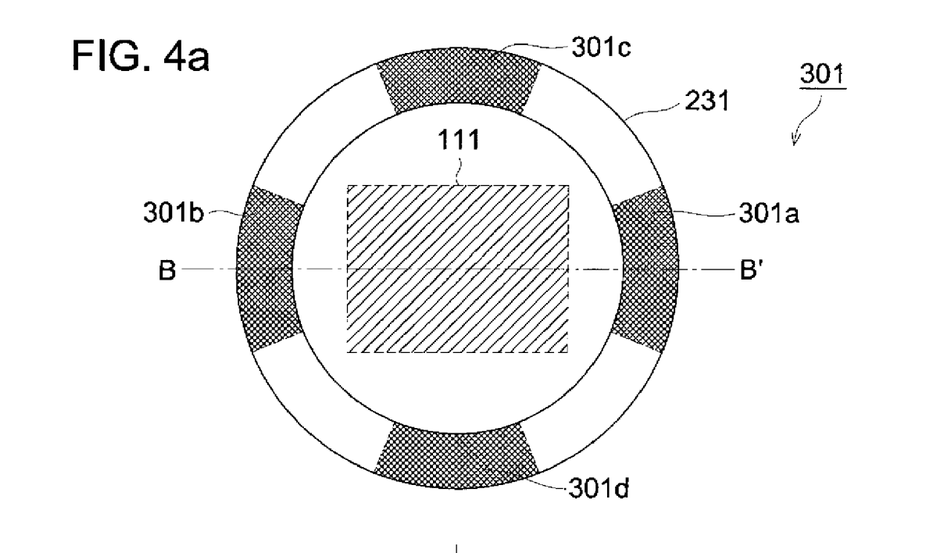
FIGS. 4a, 4b, and 4c are the schematic diagrams representing the structure of a third example of the drive element.
Figure 4B:
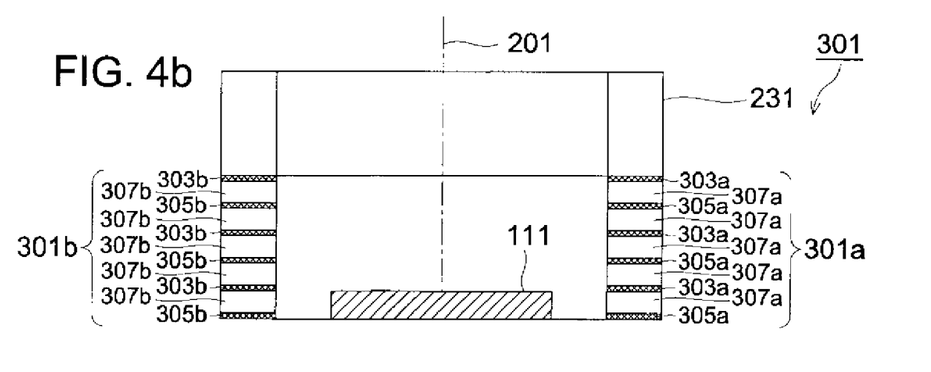
Figure 4C:
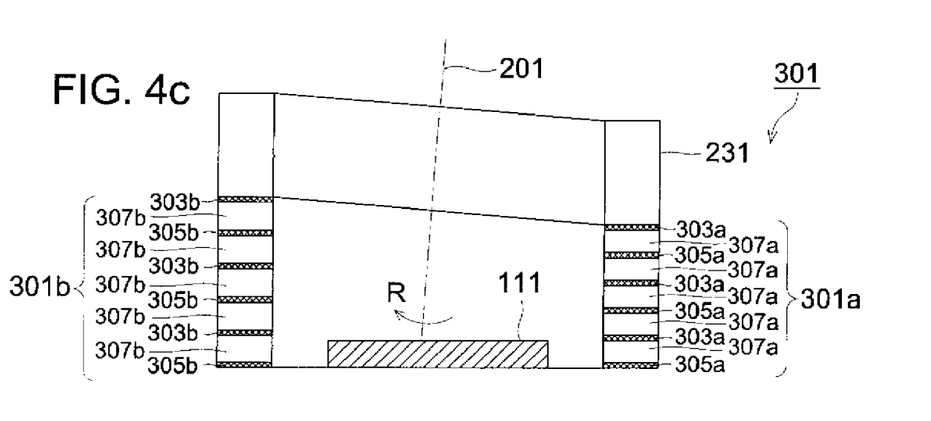

The following describes a third example of the drive element 301 with reference to FIGS. 4a, 4b, and 4c. FIGS. 4a, 4b, and 4c are the schematic diagrams representing the structure of the third example of the drive element 301. FIG. 4a is a top view showing the drive element 301 and optical system support 231 as viewed from the side of the optical system support 231. FIGS. 4b and 4c are the cross sectional views taken along arrow line B-B'. The optical system support 231 is illustrated in a simplified form having the same cylindrical shape as the drive element 301.

In FIG. 4a, the drive element 301 per se is cylindrical, and the first electrode 303a, 303b, 303c, 304d and the second electrode 305a, 305b, 305c, 305d thereof are not formed over the entire surface. They are formed as partial electrodes 303a, 305a, 303b, 305b, 303c, 305c, 303d, and 305d at four positions at intervals of 90 degrees. Thus, the drive element 301 is composed of four partial elements 301a, 301b, 301c, and 301d, and four portions that do not function as a drive element among partial elements.

The cross section B-B' of the drive element 301 and optical system support 231 in FIG. 4b is the same as those of FIGS. 2a, 2b, 2c, and 2d or FIG. 3, except that electrodes 303a, 305a, 303b, and 305b are partial electrodes. The drive element 301 and optical system support 231 are preferably integrally formed, similar to the case of FIG. 3.

In FIG. 4c, when drive voltage V is selectively applied only between the partial electrodes 303a and 305a, only the variable portions 307a contract, and only the partial element 301a contracts, without the partial element 301b being changed. Thus, only the upper portion of the partial element 301a of the optical system support 231 is pulled down in the direction of the optical axis. This arrangement enables a tilting operation, wherein the optical axis 201 is tilted in the direction of arrow R.

The above has shown the example wherein drive a voltage V is applied only to the partial element 301a. If different drive voltages V are applied to four partial elements 301a, 301b, 301c, and 301d respectively, the optical axis 201 can be tilted in any directions. Thus, this arrangement enables not only image stabilization and correction of partial defocus, but also sophisticated photographing such as swing/tilt photographing. When one and the same drive voltage V is applied to each of the four partial elements, the auto-focusing operation can be performed, as in the case of the first embodiment of the image pickup apparatus 10.

The drive element 301 is not necessarily divided into four pieces. For example, the drive element 301 can be divided into three parts, which can be arranged in the form of a regular triangle. Further, various forms of variation can be considered in conformity to the purpose of use.

As described above, in addition to the advantages provided by the first embodiment of the optical unit 200 and image pickup apparatus 10, the first example of the drive element 301 and the second example of the drive element 301, the third example of the drive element 301 allows the drive element 301 to be divided into partial elements and the optical axis 201 to be tilted. Thus, the third example of the drive element 301 provides an image pickup apparatus 10 that enables not only image stabilization and correction of partial defocus, but also sophisticated photographing such as swing/tilt photographing.

Figure 5A:
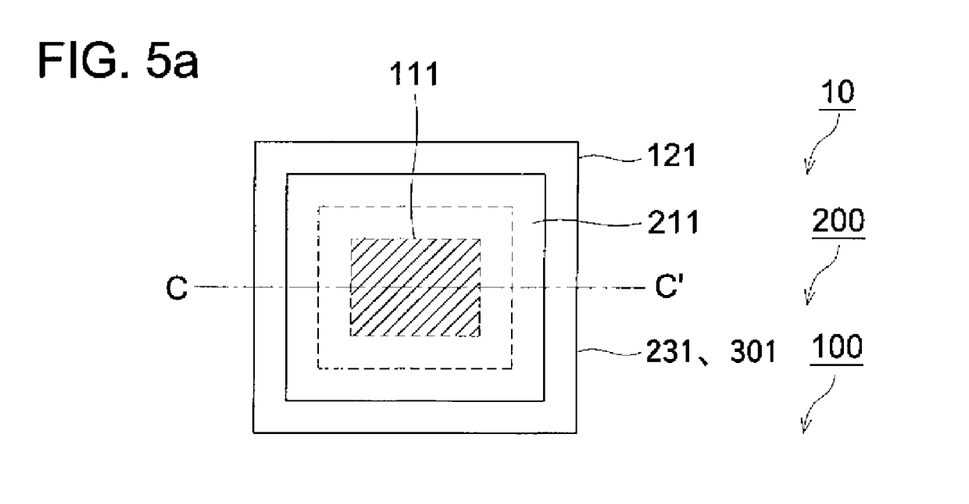
FIGS. 5a and 5b are the schematic diagrams representing the structure of a second embodiment of the optical unit and image pickup apparatus of the present invention.
Figure 5B:
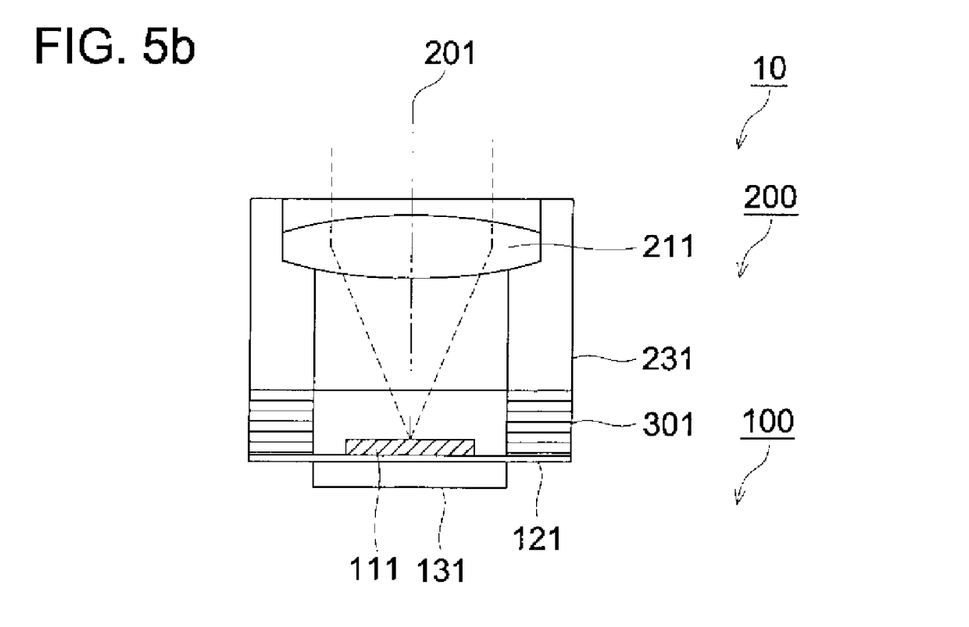

Referring to FIGS. 5a and 5b, the following describes a second embodiment of the optical unit and image pickup apparatus of the present invention. FIGS. 5a and 5b are the schematic diagrams representing the structure of the second embodiment of the optical unit 200 and image pickup apparatus 10 of the present invention. FIG. 5a shows the optical unit 200 and image pickup apparatus 10 as viewed from the side of the image pickup optical system. FIG. 5b is a cross section view taken along arrow line C-C' of FIG. 5a.

The difference between the second embodiment and the first embodiment is that the first embodiment uses a circular image pickup optical system 211, cylindrical holding frame 221, optical system support 231 and drive element 301, whereas the second embodiment utilizes the image pickup optical system 211 of the same square shape as an image pickup device 111, and the rectangular optical system support 231 and drive element 301. The optical system support 231 functions as a lens cone of the present invention.

The second embodiment gives an example particularly appropriate to compact configuration, where the image pickup optical system 211 is made up of one lens, the holding frame 221, optical system support 231 and drive element 301 are built as an integral structure, and the image pickup board 121 has the same size as the optical system support 231 or drive element 301. Thus, the image pickup apparatus 10 is a square block similar to a die. This arrangement provides the optimum shape for being mounted in a mobile phone with a built-in camera in particular. In this example, the drive element 301 can be divided into partial elements, as shown in FIGS. 4a, 4b, and 4c.

As described above, in the second embodiment of the optical unit 200 and image pickup apparatus 10, use of the square image pickup optical system 211, and rectangular optical system support 231 and drive element 301 enables the image pickup apparatus 10 to be formed into one square block similar to a die. This arrangement provides an optical unit 200 and image pickup apparatus 10 which are characterized by compact configuration and high performance and which are preferably used in a mobile phone with a built-in camera.

Figure 6A:
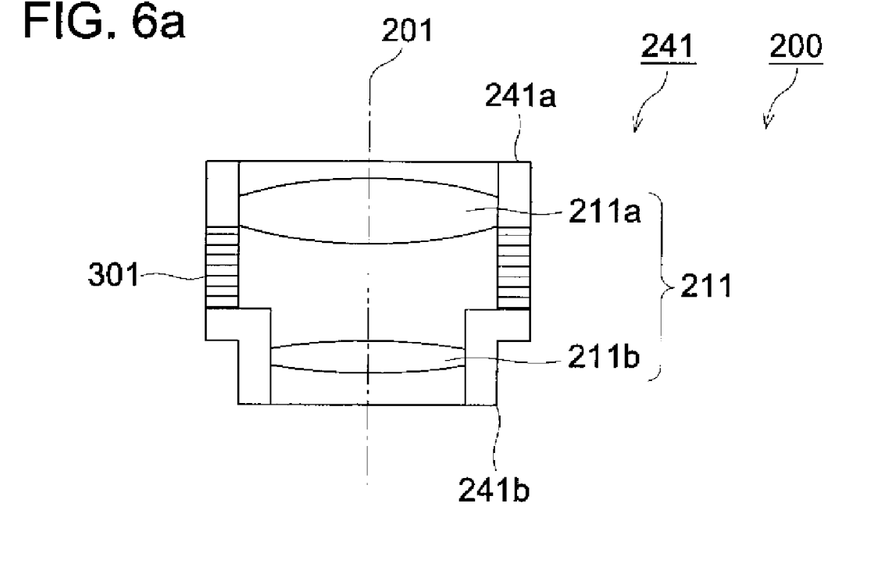
FIGS. 6a and 6b are the cross sectional views showing the structure of the third embodiment of the optical unit of the present invention.
Figure 6B:
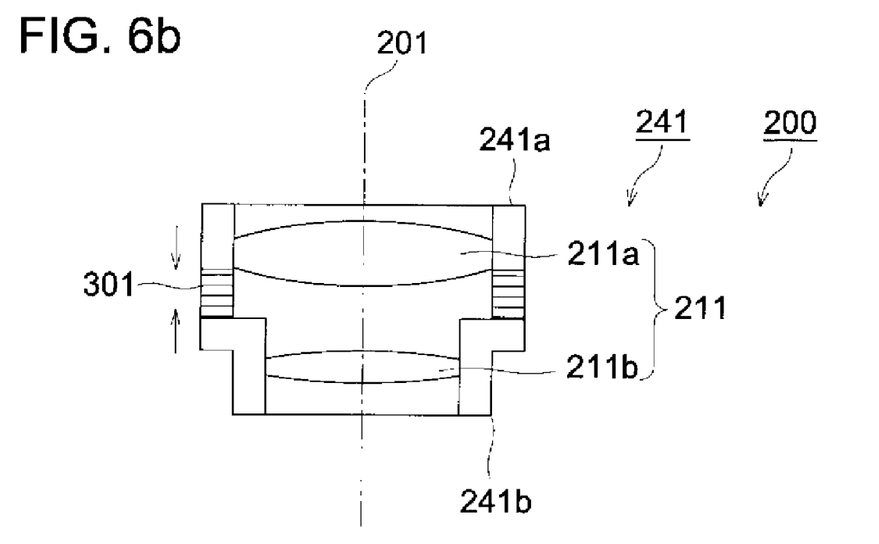

Referring to FIGS. 6a and 6b, the following describes a third embodiment of the optical unit 200 in the present invention. FIGS. 6a and 6b are the cross sectional views showing the structure of the third embodiment of the optical unit 200 of the present invention. FIG. 6a shows that the drive element 301 is not expanded or contracted, while FIG. 6b shows that the drive element 301 is contracted.

In FIG. 6a, the optical unit 200 includes an image pickup optical system 211 and a lens cone 241. The image pickup optical system 211 includes two lenses 211a and 211b. The lens cone 241 is made up of the first lens cone 241a and the second lens cone 241b. The lens 211a is held by the first lens cone 241a, and the lens 211b is held by the second lens cone 241b. A drive element 301 is arranged between the first lens cone 241a and the second lens cone 241b. The drive element 301 is a cylindrical stacked-type actuator, as shown in FIGS. 2a, 2b, 2c, and 2d.

The first lens cone 241a, the second lens cone 241b, and drive element 301 can be separate from one another, as shown in FIGS. 1a and 1b, or FIGS. 2a, 2b, 2c, and 2d, or can be integral with one another, as shown in FIG. 3.

In FIG. 6b, when a drive voltage V is applied to the drive element 301, the drive element 301 is contracted, and the distance between the first lens cone 241a and the second lens cone 241b, namely, the distance between the lenses 211a and 211b is reduced. Thus, the focus position of the image pickup optical system 211 can be changed, whereby an auto-focusing function can be performed.

Further, the drive element 301 can be divided into partial elements, as shown in FIGS. 4a, 4b, and 4c. Division into partial elements allows the optical axis 201 of the image pickup optical system 211 to be tilted. This permits an image stabilizing function as well as an auto-focusing function to be performed.

As described above, in the third embodiment of the optical unit 200, when drive element 301 is placed between the first lens cone 241a and the second lens cone 241b, the distance between the lenses 211a and 211b can be changed, whereby the auto-focusing function can be achieved. Further, when the drive element 301 is divided into partial elements, the image stabilizing function as well as the auto-focusing function can be performed. Thus, the third embodiment of the optical unit 200 provides an optical unit 200 and image pickup apparatus 10 which are characterized by compact configuration and high performance and which are preferably used in a mobile phone with a built-in camera.

The aforementioned drive element 301 or integrated drive element 301 and optical system support 231 can be manufactured by (1) the method of stacking the electrodes and variable portions by printing; (2) the method of coating the electrodes and variable portions by the inkjet system and laminating them; and (3) the method of stacking the electrodes and variable portions formed in sheets and then die-cutting them followed by hardening by heating.

In the aforementioned description of the operation of the drive element 301 in each of the aforementioned embodiments, when a drive voltage V is applied, the drive element 301 contracts. The operation will be the reverse when using a drive element (e.g., one type of the aforementioned liquid crystal elastomer) which expands by the application of voltage.

As described above, in the embodiments of the present invention, a drive element for driving the lens cone holding the image pickup optical system is provided, and the drive element expands and contracts in the direction of the optical axis of the image pickup optical system, whereby the image pickup optical system can be driven when the outside shape is about the same as that of the lens cone. Thus, the embodiment of the present invention provides an optical unit which is characterized by compact configuration, high performance and minimized noise, and which is preferably used in a mobile phone with a built-in camera. Further, in the embodiments of the present invention, the optical unit and image pickup unit are directly coupled through the drive element, and the drive element expands and contracts in the direction of the optical axis of the optical unit, whereby the optical unit can be driven when the outside shape is about the same as that of the optical unit. Thus, the embodiments of the present invention provide an image pickup apparatus which is characterized by compact configuration, high performance and minimized noise, and which is preferably used in a mobile phone with a built-in camera.

The detailed structure and detailed operation of the components constituting the optical unit and the image pickup apparatus of the present invention can be modified as required, without departing from the technological spirit and scope of the invention claimed.

What is claimed is:

1. An optical unit, comprising:
   an image pickup optical system;
   a lens barrel which holds the image pickup optical system and has a tubular shape through which an optical axis of the image pickup optical system extends, one end face of the lens barrel having an opening through which the optical axis of the image pickup optical system extends, and being directed to an image plane of the image pickup optical system; and
   an electrostrictive drive element which is adapted to deform according to a voltage applied between a first end face thereof and a second end face thereof so as to expand and contract in a direction of an electric field formed by the applied voltage, and is provided such that the drive element surrounds the optical axis of the image pickup optical system, and the first end face of the drive element supports the one end face of the lens barrel, and a direction of the expansion and contraction of the drive element is parallel to the optical axis of the image pickup optical system.

2. An optical unit, comprising:
   an image pickup optical system;
   a lens barrel which is constituted by a first partial lens barrel and a second partial lens barrel, at least one of the first partial lens barrel and the second partial lens barrel holding the image pickup optical system, the first partial lens barrel and the second partial lens barrel having a tubular shape through which an optical axis of the image pickup optical system extends, one end face of the first partial lens barrel being directed to the second lens barrel and having an opening through which the optical axis of the image pickup optical system extends, and one end face of the second partial lens barrel being directed to the first lens barrel and having an opening through which the optical axis of the image pickup optical system extends; and
   an electrostrictive drive element which is configured to deform according to a voltage applied between a first end face thereof and a second end face thereof so as to expand and contract in a direction of an electric field formed by the applied voltage, and is provided between the first partial lens barrel and the second partial lens barrel such that the drive element surrounds the optical axis of the image pickup optical system, and the first end face of the drive element supports the one end face of the first partial lens barrel, the second end face of the drive element supports the one end face of the second partial lens barrel, and a direction of the expansion and contraction of the drive unit is parallel to the optical axis of the image pickup optical system,
   wherein the expansion and contraction of the drive element caused, in a direction parallel to the optical axis, by the applied voltage directly drives the first partial lens barrel and the second partial lens barrel in the same direction as the expansion and contraction of the drive element to vary a distance between the first partial lens barrel and the second partial lens barrel by an amount equal to an amount of the expansion and contraction of the drive element.

3. The optical unit of claim 2, wherein the image pickup optical system includes a plurality of optical elements, and each of the first partial lens barrel and the second partial lens barrel holds at least one of the optical elements.

4. The optical unit of claim 1, wherein the drive element includes a plurality of individual electrostrictive drive elements, each of which is arranged at a different position in a rotational direction about the optical axis of the image pickup optical system, and each of the individual electrostrictive drive elements is configured to expand and contract in a direction parallel to the optical axis of the image pickup optical system.

5. The optical unit of claim 2, wherein the drive element includes a plurality of individual electrostrictive drive elements, each of which is arranged at a different position in a rotational direction about the optical axis of the image pickup optical system, and is configured to expand and contract in a direction parallel to the optical axis of the image pickup optical system.

6. The optical unit of claim 1, wherein the lens barrel and the drive element are integrally formed.

7. The optical unit of claim 2, wherein the lens barrel and the drive element are integrally formed.

8. The optical unit of claim 1, wherein the drive element includes a stacked-type actuator.

9. The optical unit of claim 2, wherein the drive element includes a stacked-type actuator.

10. An image pickup apparatus, comprising:
an image pickup optical system;
a lens barrel which holds the image pickup optical system and has a tubular shape through which an optical axis of the image pickup device optical system extends, one end face of the lens barrel having an opening through which the optical axis of the image pickup optical system extends;
an image pickup unit having an image pickup device, one face of the image pickup unit being directed to the lens barrel, and one end face of the lens barrel being directed to the image pickup unit; and
an electrostrictive drive element which is configured to deform according to a voltage applied between a first end face thereof and a second end face thereof so as to expand and contract in a direction of an electric field formed by the applied voltage, and is provided between the lens barrel and the image pickup unit such that the drive element surrounds the optical axis of the image pickup optical system, and the first end face of the drive element supports the one end face of the lens barrel, the second end face of the drive element supports the one face of the image pickup unit, and a direction of the expansion and contraction of the drive unit is parallel to the optical axis of the image pickup optical system,
wherein the expansion and contraction of the drive element caused, in a direction parallel to the optical axis, by the applied voltage directly drives the lens barrel and the image pickup unit in the same direction of the expansion and contraction of the drive element so as to vary a distance between the lens barrel and the image pickup unit by an amount equal to an amount of the expansion and contraction of the drive element.

11. An image pickup apparatus, comprising:
an image pickup optical system;
a lens barrel which holds the image pickup optical system;
an image pickup unit having an image pickup device, one face of the image pickup unit being directed to the lens barrel, and one end face of the lens barrel being directed to the image pickup unit; and
a plurality of electrostrictive drive elements, each of which is configured to deform according to a voltage applied between a first end face thereof and a second end face thereof so as to expand and contract in a direction of an electric field formed by the applied voltage, and which are provided between the lens barrel and the image pickup unit at different positions in a rotational direction about an optical axis of the image pickup optical system such that the first end face of each of the drive elements supports the one end face of the lens barrel, the second end face of each of the drive elements supports the one face of the image pickup unit, and a direction of the expansion and contraction of the drive unit is parallel to the optical axis of the image pickup optical system,
wherein the expansion and contraction of each of the plurality of electrostrictive drive elements caused, in a direction parallel to the optical axis, by the applied voltage directly drives the lens barrel and the image pickup unit in the same direction as the expansion and contraction of the drive element, and when the plurality of electrostrictive drive elements are supplied with different voltages, the optical axis of the image pickup optical system is tilted.

\* \* \* \* \*